Patented Dec. 13, 1938

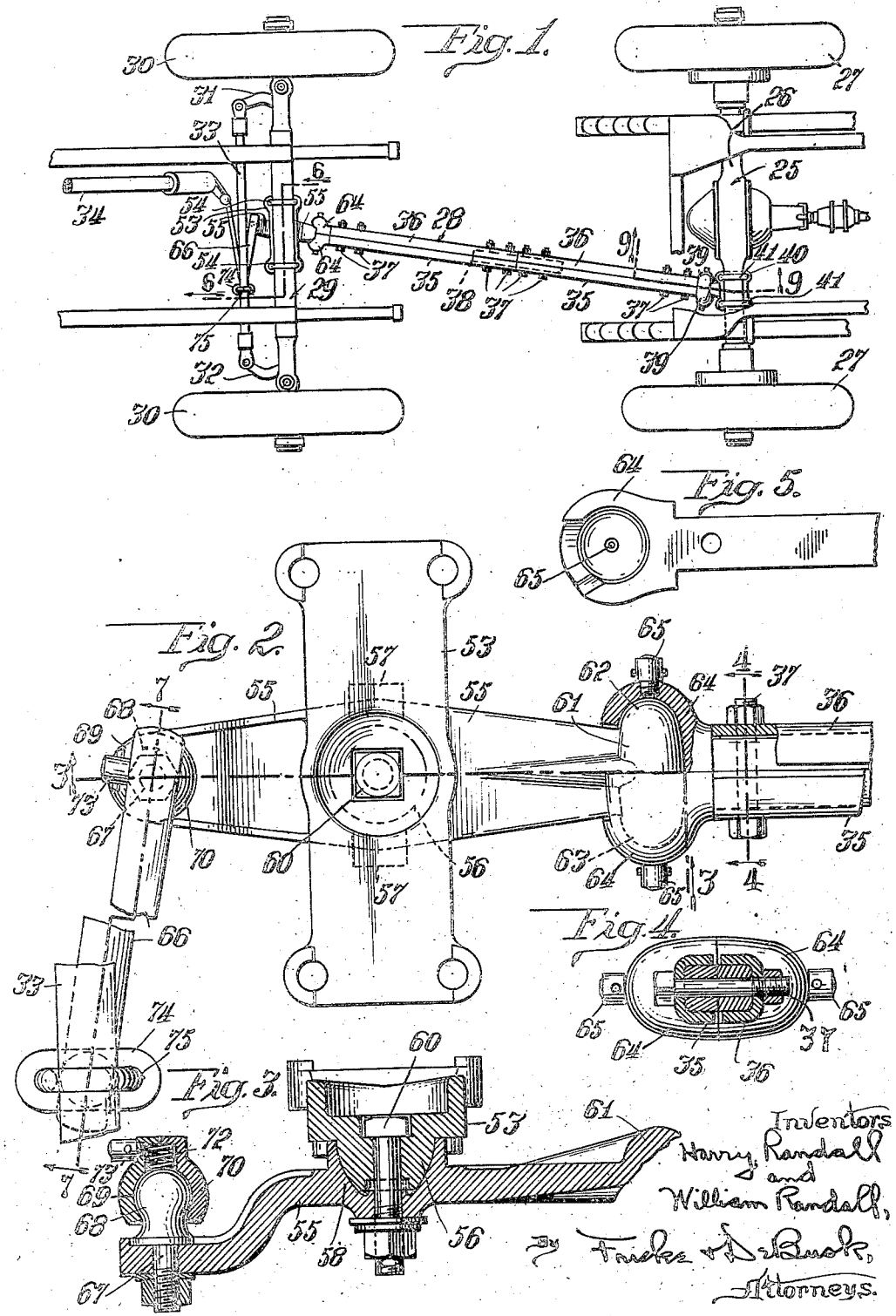

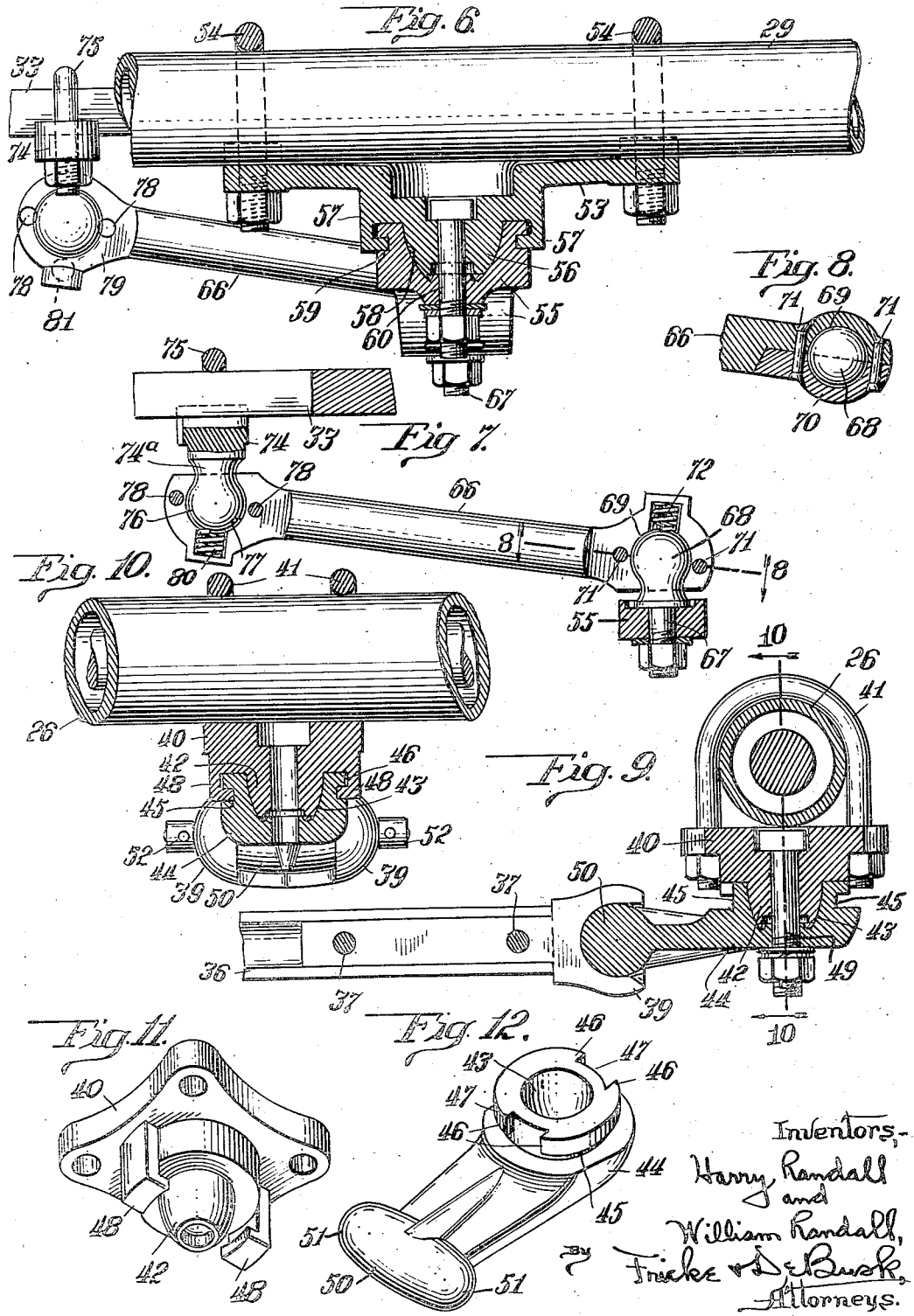

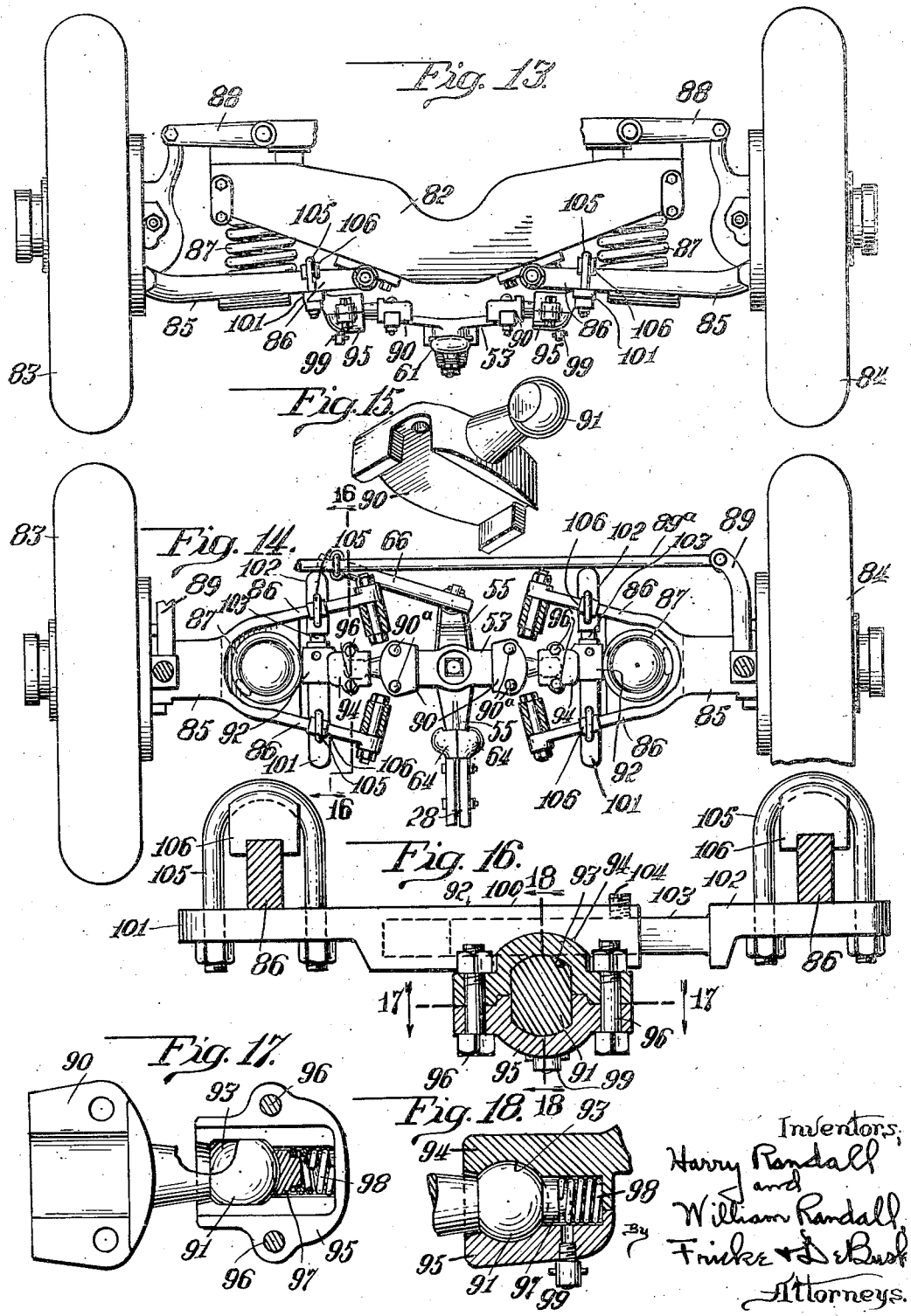

2,139,693

UNITED STATES PATENT OFFICE 2,139,693

AUTOMOBILE TOWING DEVICE

Harry Randall and William Randall, Chicago, Ill.

Application April 9, 1936, Serial No. 73,465
Renewed March 11, 1938

11 Claims. (Cl. 280—33.55)

Our invention relates to automobile towing devices of the type by which two automobiles are connected one behind the other by a draw bar and comprising means controlled by the angular position of the draw bar for angling the front wheels of the rear automobile so as to cause the two cars to follow quite closely the same track. It is the object of our invention to provide a new and improved form and arrangement of parts in a towing device of this type whereby there shall be the required freedom of movement of the parts, whereby lost motion shall be effectively taken up at the joints, whereby the application and retention of grease or other proper lubricant for the joints may be assured, and whereby the required strength and reinforcement shall be provided at the critical points for preventing breakage of the parts.

It is another object of our invention to provide an improved arrangement of parts in a towing device of this type for connection to the mounting means for knee-action wheels whereby this type of car can be towed satisfactorily. It is one of the objects of our invention to provide improved parts for use in connection with knee-action wheels so arranged and designed as to cooperate with certain of the parts arranged for use with a straight axle car so that by the provision of a limited number of such auxiliary parts a device for use with one type of car can be rearranged for use effectively for the other type of car.

It is another object of our invention to improve devices of this type in sundry details hereinafter pointed out. The preferred means by which we have accomplished our several objects are illustrated in the drawings and are hereinafter specifically described. That which we believe to be new and desire to cover by Letters Patent is set forth in the claims.

In the drawings,—

Fig. 1 is a top plan view showing the rear end portion of the chassis of one car at the right and the front end portion of the chassis of a straight axle car at the left, with the two operatively connected by our improved towing mechanism;

Fig. 2 is a top plan view of a heavy plate by which connection is effected with the straight front axle member of the car being towed, together with the adjacent connected parts, such parts being shown on a considerably enlarged scale as compared with the showing of Fig. 1;

Figs. 3 and 4 are vertical sectional views taken at line 3—3 and line 4—4 respectively of Fig. 2;

Fig. 5 is an inside face view of one of the socket members by which the draw bar is connected with its cooperating parts;

Fig. 6 is an enlarged sectional view taken at line 6—6 of Fig. 1;

Fig. 7 is a vertical sectional view taken at line 7—7 of Fig. 2;

Fig. 8 is a horizontal sectional view taken at line 8—8 of Fig. 7;

Fig. 9 is an enlarged vertical sectional view taken at line 9—9 of Fig. 1;

Fig. 10 is a vertical sectional view taken at line 10—10 of Fig. 9, but with the removable king bolt omitted for clearness of illustration;

Figs. 11 and 12 are perspective views of two interfitting members comprising a part of the means for connecting the draw bar with the rear one of the connected cars;

Fig. 13 is a front view of the chassis of a car having knee-action wheels and equipped with our improved means for connecting a draw bar thereto;

Fig. 14 is a horizontal plan view of the parts shown in Fig. 13 but with some of the parts omitted and others partly broken away;

Fig. 15 is an enlarged perspective view of one of the connecting parts of the mechanism shown in Figs. 13 and 14;

Fig. 16 is an enlarged vertical sectional view taken at line 16—16 of Fig. 14;

Fig. 17 is a horizontal sectional view taken at line 17—17 of Fig. 16 but turned through an angle of 90° to a position corresponding to the position of the parts as shown in Fig. 14, a portion of the ball member of the joint being broken away for clearness of illustration; and Fig. 18 is a vertical sectional view taken at line 18—18 of Fig. 16.

Referring now to Figs. 1 to 12 inclusive, in which corresponding parts are indicated by the same reference characters, 25 indicates the rear portion of the framework of an automobile (see Fig. 1) comprising a rear axle housing 26, supporting wheels 27 being illustrated in operative position on the framework. In the arrangement shown in Fig. 1, the draw bar 28 of a form hereinafter described is connected at its front end with the axle housing 26 and is suitably connected at its rear end with the front axle 29 forming a part of the framework of another automobile, the carrying and steering wheels of said second automobile being indicated by numerals 30. The automobile at the left in Fig. 1 is provided with steering knuckle arms 31 and 32 at opposite sides of the car connected by a cross rod 33 which in turn has a suitable articulated connection with the steering post 34, all of such parts being of any approved form.

In the arrangement shown, the draw bar 28 comprises two channel members 35 and 36, as is best shown in Fig. 4 which are secured together by bolts 37. In the arrangement shown, the channels 35 and 36 are formed in sections and secured together by means of coupling blocks 38 as is shown in Fig. 1. At its front end, the draw bar 28 is provided with a pair of socket pieces 39 which are secured in position by means of the bolts 37.

The means for connecting the front end of the draw bar with the automobile at the right in Fig. 1 comprises a plate member 40 (see Figs. 9, 10 and 11) which is secured rigidly in position below the rear axle housing 26 by means of U-bolts 41. On its bottom face, the plate 40 is provided with a circular boss or lug 42 which has a working fit in a socket 43 formed in the top face of a second plate 44 (see Fig. 12). The plate 44 is provided with circumferentially extending grooves 45 thereabout defined at one side by a circumferential rib 46, as is shown in said Fig. 12. The rib 46 is discontinued at two points thereabout as shown at 47 to provide for the entrance of arms 48 carried by the plate 40. Upon a proper presentation of the plate 40 to the plate 44, the arms 48 are adapted to extend downwardly through the notches 47 as the boss 42 is lowered into the socket 43. When the plate 40 reaches its completely lowered position the plate 40 is given a rotary motion through 90° for bringing the lugs 48 into effective engagement with the grooves 45 serving to hold the plates 40 and 44 securely locked together. In the arrangement shown, the plates are further secured together by means of a heavy bolt 49 which is positioned in axial openings through the two plates, the bolt serving effectively to close such axial openings as well as to reinforce the retaining arms or lugs 48. The arrangement is such that any stiff grease which is placed within the socket 43 at the time of assembly is retained in the socket so as to provide effective lubrication of the two plates with respect to each other.

As is clearly shown in Figs. 9 and 12, the plate 44 terminates at its rear end in a head portion 50 which is substantially cylindrical but which is rounded at its end portions, this arrangement serving to provide rounded lugs 51 projecting beyond the sides of the plate at its end. The arrangement is such that the head 50 has a working fit within the socket pieces 39 so as to permit the draw bar 28 to have pivotal motion vertically with respect to the plate 44 while being held strongly against horizontal swinging movement with respect to said plate. In the arrangement shown, the socket pieces 39 are provided with grease gun fittings 52 of any approved type by which grease can be forced into effective position for long continued lubrication of the head 50 with respect to the socket pieces.

The means for connecting the rear end of the draw bar 28 with the automobile at the left in Fig. 1 comprises a heavy plate 53 (see Fig. 2) which is placed underneath the front axle 29 and secured in position thereon by means of U-bolts 54 (see Fig. 6). Below the plate 53, we have provided a second plate 55, the plates 53 and 55 being connected together by the use of a circular boss on the one engaging a socket in the other and of the same general arrangement as that above described in connection with the plates 40 and 44. In the arrangement shown, the plate 53 is provided with a circular lug or boss 56 and retaining lugs or arms 57 cooperating with a socket 58 and circumferential grooves 59 in the plate 55. The arrangement is such that the plates 53 and 55 are effectively held in cooperative relation when they are turned in crossed relationship to each other after engagement as shown in Fig. 2. A heavy bolt 60 is employed in axial openings through the plates 53 and 55 serving to reinforce the means by which the boss 56 is retained in the socket 58 and serving also effectively to close the axial openings so as to enable the socket effectively to retain cup grease therein.

As is best shown in Fig. 2, the front end of the plate 55 terminates in a head portion 61 which is substantially cylindrical in form but is rounded at its end portions so as to provide rounded lugs 62 and 63 extending beyond the sides of the plate 55 for effective engagement with socket pieces 64 corresponding to the socket pieces 39 above referred to, two of such socket pieces 64 being secured in the rear end of the draw bar by two of the bolts 37. In the arrangement shown, the socket members 64 are provided with grease gun fittings 65 of any suitable type through which grease can be fed into effective position for lubrication.

At its rear end, the plate 55 is connected with the cross rod 33 of the steering mechanism of the rear automobile, such connection being effected by the use of a rod 66. The rod 66 is connected with the rear end portion of said plate 55 by means of a pin or bolt 67 (see Fig. 7) secured in an opening in said plate, such pin 67 being provided with a rounded head 68 at its upper end having a working fit in a socket 69 formed in the end of said rod. As is best shown in Fig. 8, the rod 66 is formed in two parts at its end portion for facilitating the formation of the socket, the portion 70 being held in position by means of rivets 71. A spring 72 is mounted in the socket opposite the end of the pin 67 for taking up lost motion. A grease gun fitting 73 is provided (see Fig. 3) opening to the spring 72 for the proper introduction of grease to the socket.

The rod 66 is connected at its opposite end with the cross rod 33 of the steering mechanism of the car by means of a clip comprising a V-plate 74 (see Fig. 7) secured in position by means of a U-bolt 75, such plate 74 having a rounded head portion 76 formed thereon which in turn has a working fit in a socket 77 formed in the end of the rod 66. The rod 66 at this end also is formed in two parts, rivets 78 serving to hold the removable part 79 in position. A spring 80 is mounted in said socket at the point opposite the plate 74 for taking up lost motion, and a grease gun fitting 81 is provided opening to said spring from the side as is shown in dotted lines in Fig. 6.

With the parts assembled in the manner as illustrated in the drawings and particularly as shown in Fig. 1, with the steering wheels 30 of the rear automobile directly behind the wheels 27 of the automobile in front and with the rod 66 connected with the cross rod 33 in position for holding the wheels 30 aligned with the wheels 27, it is clear that two cars are adapted to move normally along a straight road without the necessity for the employment of a helper in the rear car. It is further evident that when the draw bar 28 is swung toward one side or the other by reason of the front automobile (at the right in Fig. 1) being swerved toward that side, the front wheels 30 of the rear car are correspondingly angled so as to cause the rear car to follow closely the track of the front car. The arrangement is such that two or more cars connected in series in this manner can be transported at fairly high speed along the highway and that even fairly high speed can be made around curves without danger of accident by reason of the tandem arrangement of the cars. The parts are preferably made in the form of malleable castings and are of such weight as to have ample strength so as to avoid breakage under any normal circumstances. By reason of the articulation of the parts as above described and by reason of the ample and effective provision for lubricating the parts, the towing device is adapted to stand up through long continued use under trying conditions. By reason of the fact that the socket members forming parts of the principal joints substantially surround and enclose the cooperating head portions so as to prevent the escape of lubricant, the device is made effective for long continued use without likelihood of undue wear when given merely average attention on the part of the operator.

In Figs. 13 to 18, we have shown our improved towing device applied to the front end of an automobile having knee-action wheels. The means for connecting the draw bar as shown in Figs. 13 to 18 to the front car is to be the same preferably as that above described in connection with the arrangement shown in Figs. 1 to 12.

Referring now to Figs. 13 to 18, and particularly to Fig. 13, 82 indicates the transverse frame bar of an automobile whose wheels 83 and 84 are independently mounted for having the characteristic knee-action. For this effect, each wheel is mounted upon a yoke 85, the arms 86 of which diverge inwardly, being pivotally connected at their inner ends with the transverse frame bar 82 so as to be free to swing vertically with respect thereto. Heavy coiled springs 87 are interposed between the yoke members 85 and the ends of the frame bar 82, and stabilizer links 88 are provided to cooperate with the yokes 85 for giving the wheels 83 and 84 the desired freedom of movement. Steering knuckle arms 89 connected with the stub axles of the wheels are connected by the usual cross rod 89a. The arrangement of the parts with respect to the mounting of the wheels is to be of any approved type suitable for the purpose.

Our improved towing mechanism as applied to the car comprises a plate 53 and a plate 55 of the same type as is shown in Fig. 2 of the drawings, the front end of the plate 55 being provided with a head 61 by which the draw bar 28 is connected by the use of socket pieces 64 as heretofore described.

In our improved arrangement as shown in Figs. 13 to 18, the plate 53 is not connected directly to the framework as shown in Fig. 6 but is rather connected through the yoke members 85. For effecting this result, the plate 53 is provided at its ends with extension blocks 90 which are held in position by means of bolts 90a passing through the openings in the plate 53 through which the U-bolts 54 pass in the arrangement as shown in Fig. 6. Such extension blocks 90 are of such size and arrangement as to extend beyond the ends of the plate 53, being provided on their outer end faces with rounded head portions 91 flattened on their sides, as is best shown in Fig. 16. Upon the head portions 91 at the opposite ends of the cross head comprising the plate 53 and the extension blocks 90, we have mounted extension bars 92 in crossed relationship to the cross head. In the arrangement shown, the connection of the extension bars with the cross head is effected by means of sockets 93 formed in the inner face portions of the extension bars and conforming to the shape of the heads 91 so as to enable the extension bars to have a vertical swinging movement with respect to the cross head but so as to prevent horizontal swinging movement of the extension bars. For enabling the parts to be readily assembled, the sockets 93 are formed in two parts comprising a lug portion 94 formed as a part of the extension bar and a separable cap 95 held in position by bolts 96. As is clearly shown in Figs. 17 and 18, a wear plate 97 is provided at the outer end of the ball 91 pressed by a heavy coiled spring 98 against the ball for taking up lost motion. Grease gun fittings 99 are provided in the cap portions 95 opening to the springs 98 as is best shown in Fig. 18.

In the arrangement shown, each of the extension bars 92 is formed in two parts comprising a body portion 100 having a reduced portion 101 at one end extending underneath one of the arms 86 of one of the yokes 85. At its opposite end, the body portion 100 is provided with a slidably mounted member 102, a shank 103 of which is held in adjusted position by means of a set screw 104, the portion 102 extending underneath the other one of the yoke arms 86. The parts 101 and 102 are rigidly connected with the arms 86 of the yokes by means of U-bolts 105. In the arrangement shown, fittings 106 are provided for giving the U-bolts the desired gripping engagement with the arms 86.

In the arrangement shown, the rear end portion of the plate 55 is connected with the cross bar 89a of the steering apparatus by means of a rod 66 of the same type as that described in connection with Figs. 1 to 12.

By the use of our improved arrangement the cross head comprising the plate 53 and the extension blocks 90 and terminating in head portions 91 is securely connected between the yoke members 85 of the automobile so as to have a forward pull applied thereto through the draw bar 28 while at the same time permitting the yokes 85 to move up and down toward and from the chassis frame against the action of the springs 87. In this way we have provided a satisfactory towing means for use in connection with cars having knee-action wheels.

While we prefer to employ the form of arrangement as shown in our drawings and as above described, it is to be understood that our invention is not to be limited to the arrangement as shown except as the narrower claims may be so limited by their terms, it being understood that changes might well be made in the form and arrangement of parts without departing from our invention.

We claim:—

1. In a towing device for an automobile having its front wheels journaled respectively on mounting members movable yieldingly toward and from the chassis frame independently of each other, the combination of a cross head, means for pivotally connecting said cross head at its ends with said wheel mounting members so as to be free to swing vertically with respect thereto but held against swinging horizontally, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, and means for giving said plate an articulated connection with the steering apparatus of the automobile whereby when the towing device has been applied to an automobile the wheels are angled as the draw bar is swung horizontally.

2. In a towing device for an automobile having its front wheels journaled respectively on mounting members movable yieldingly toward and from the chassis frame independently of each other, the combination of a cross head, extension bars pivotally connected with said cross head at its ends in crossed relationship thereto so as to be free to swing vertically but held against swinging movement horizontally, means for securely connecting said extension bars with said wheel mounting members at opposite sides of the automobile for holding the cross head in position transversely of the car, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

3. In a towing device for an automobile having its front wheels journaled respectively on mounting members movable yieldingly toward and from the chassis frame independently of each other the combination of a cross head, extension bars pivotally connected with said cross head at its ends in crossed relationship thereto so as to be free to swing vertically but held against swinging movement horizontally, each of said extension bars being formed of two parts adjustable longitudinally with respect to each other for adjusting the effective length of the bar, means for rigidly connecting both of the parts of said extension bars with said wheel mounting means at opposite sides of the automobile for holding the cross head in position transversely of the car, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

4. In a towing device for an automobile having its front wheels journaled respectively on mounting members movable yieldingly toward and from the chassis frame independently of each other, the combination of a cross head, extension bars pivotally connected with said cross head at its ends in crossed relationship thereto so as to be free to swing vertically but held against swinging movement horizontally, each of said extension bars being formed of two parts slidably connected with each other for adjusting the effective length of the bar, means for locking said two parts in adjusted position with respect to each other, means for rigidly connecting said extension bars with said wheel mounting means at opposite sides of the automobile for holding the cross head in position transversely of the car, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

5. In a towing device for an automobile having independently suspended front wheels mounted respectively on yoke members movable yieldingly toward and from the chassis frame independently of each other, the combination of a cross head, extension bars pivotally connected with said cross head at its ends in crossed relationship thereto so as to swing vertically but held against swinging movement horizontally, means for rigidly connecting said extension bars with said yoke members respectively comprising means for connecting each of said extension bars across both arms of one of said yoke members so as to hold said cross head in position transversely of the car, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

6. In a towing device for an automobile having independently suspended front wheels mounted respectively on yoke members movable yieldingly toward and from the chassis frame independently of each other, the combination of a cross head, extension bars pivotally connected with said cross head at its ends in crossed relationship thereto so as to swing vertically but held against swinging movement horizontally, means for rigidly connecting said extension bar with said yoke members respectively so as to hold said cross head in position transversely of the car and comprising a U-bolt for connecting each of the four arms of said yokes with the adjacent end portions of the adjacent extension bar, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

7. In a towing device for an automobile having its front wheels journaled respectively on mounting members movable yieldingly toward and from the chassis frame independently of each other, the combination of a cross head terminating in rounded head portions flattened at their sides, extension bars having sockets in their inner face portions within which said head portions have a working fit for permitting the extension bars to swing vertically but serving to hold the extension bars against swinging movement horizontally, means for securely connecting said extension bars with said wheel mounting members at opposite sides of the automobile for holding the cross head in position transversely of the car, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

8. In a towing device for an automobile having its front wheels journaled respectively on mounting members movable yieldingly toward and from the chassis frame independently of each other, the combination of a cross head terminating in rounded head portions flattened at their sides, extension bars having sockets in their inner face portions within which said head portions have a working fit for permitting the extension bars to swing vertically but serving to hold the extension bars against swinging movement horizontally, heavy springs in said sockets tending to press said head portions out of the socket openings so as to take up lost motion, means for securely connecting said extension bars with said wheel mounting members at opposite sides of the automobile for holding the cross head in position transversely of the car, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

9. In a towing device for an automobile having its front wheels journaled respectively on mounting members movable yieldingly toward and from the chassis frame independently of each other, the combination of a cross head comprising a plate and extension blocks secured on the ends of the plate and projecting beyond the plate, the outer ends of said extension blocks being in the form of rounded heads flattened at their sides, extension bars having sockets in their inner face portions within which said heads have a working fit for permitting the extension bars to swing vertically but serving to hold the extension bars against swinging movement horizontally, means for securely connecting said extension bars with said wheel mounting members at opposite sides of the automobile for holding the cross head in position transversely of the car, a plate pivotally connected with said cross head so as to be free to swing horizontally but held against swinging movement vertically with respect thereto, a draw bar pivotally connected with said plate so as to be free to swing vertically but held against swinging movement horizontally with respect thereto, a rod pivotally connected at one end with said plate at a point in rear of said cross head, and means for pivotally connecting the opposite end portion of said rod with the steering apparatus of the automobile whereby when the towing device has been applied to an automobile the wheels are angled as the draw bar is swung horizontally.

10. In an automobile towing device, the combination of a draw bar, a plate pivotally connected on a transverse axis with said draw bar, a second plate, means for pivotally connecting said two plates together on a vertical axis, comprising a socket in the face of one of said plates adjacent to the other plate, a boss on said other plate having a working fit in said socket so as to permit one plate to swing horizontally on the other plate, and lugs on one of said plates extending along the outer face of the other plate at opposite sides thereof into engagement with outwardly opening groove means on said other plate for securing the plates releasably together so that said boss takes the major part of the working pressure.

11. In an automobile towing device, the combination of a draw bar, a plate pivotally connected on a transverse axis with said draw bar, a second plate, and means for pivotally connecting said two plates together on a vertical axis, comprising a socket in the face of one of said plates adjacent to the other plate, a boss on said other plate having a working fit in said socket so as to permit one plate to swing horizontally on the other plate, lugs on one of said plates extending along the outer face of the other plate at opposite sides thereof into engagement with outwardly opening grooves in the other plate for securing said boss removably in position in said socket so as to take the major portion of the pressure when power is applied tending to move one of said plates edgewise with respect to the other, and a heavy bolt secured in axially disposed openings through said two plates serving to reinforce the holding action of said lugs in said groove means and serving also effectively to close said openings for preventing the escape of cup grease from said socket.

HARRY RANDALL.
WILLIAM RANDALL.